(12) United States Patent
Shirashige

(10) Patent No.: US 11,937,011 B2
(45) Date of Patent: Mar. 19, 2024

(54) RECORDING DEVICE, IMAGING DEVICE, RECORDING METHOD, AND NON-TRANSITORY COMPUTER READABLE MEDIUM

(71) Applicant: CANON KABUSHIKI KAISHA, Tokyo (JP)

(72) Inventor: Soichiro Shirashige, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/049,033

(22) Filed: Oct. 24, 2022

(65) Prior Publication Data

US 2023/0129958 A1    Apr. 27, 2023

(30) Foreign Application Priority Data

Oct. 25, 2021 (JP) .................. 2021-173669

(51) Int. Cl.
*H04N 5/76* (2006.01)
*H04L 67/06* (2022.01)

(52) U.S. Cl.
CPC .............. *H04N 5/76* (2013.01); *H04L 67/06* (2013.01)

(58) Field of Classification Search
CPC ................... H04N 5/76; H04L 67/06
See application file for complete search history.

(56) References Cited

U.S. PATENT DOCUMENTS

| 9,465,526 | B2 | 10/2016 | Roenning | |
|---|---|---|---|---|
| 2009/0103898 | A1* | 4/2009 | Morioka | G11B 27/28 386/326 |
| 2010/0042650 | A1* | 2/2010 | Roenning | H04N 9/8205 386/242 |

FOREIGN PATENT DOCUMENTS

| JP | 2005-198231 A | 7/2005 |
|---|---|---|
| JP | 2010-98661 A | 4/2010 |
| JP | 2016-66900 A | 4/2016 |

OTHER PUBLICATIONS

Great Britain Combined Search and Examination Report dated Jul. 24, 2023 and dated Jul. 25, 2023 during prosecution of related Great Britain application No. GB2215403.3.

* cited by examiner

*Primary Examiner* — Thai Q Tran
*Assistant Examiner* — Jose M Mesa
(74) *Attorney, Agent, or Firm* — VENABLE LLP

(57) ABSTRACT

A recording device comprising at least one memory and at least one processor which function as: a setting unit configured to set a scene number; a communication unit configured to perform transmission and reception of a scene number to share the scene number with at least one other recording device; and a recording unit configured to record a file of recording data with a file name including a scene number at a start of recording the recording data and a scene number at an end of recording the recording data.

12 Claims, 7 Drawing Sheets

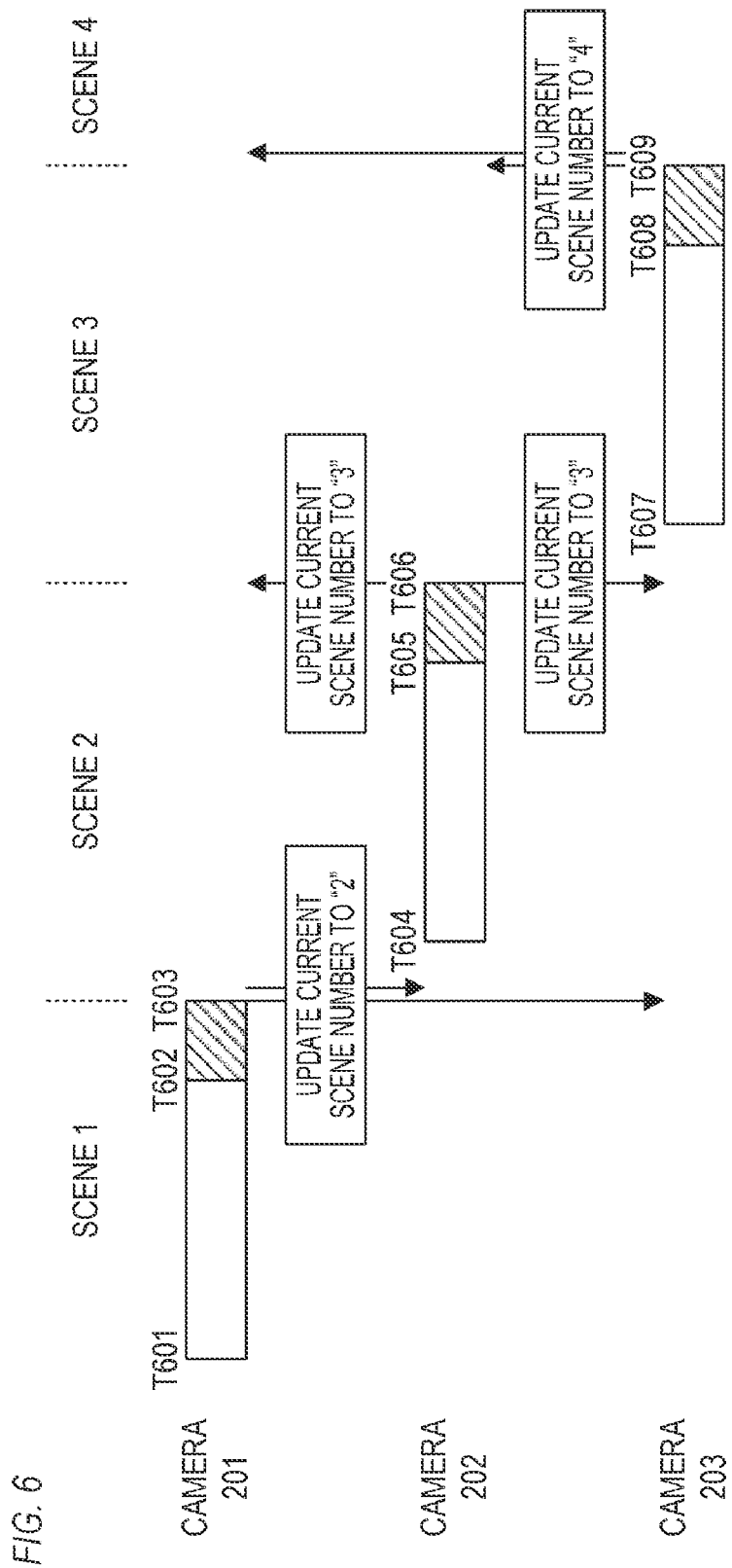

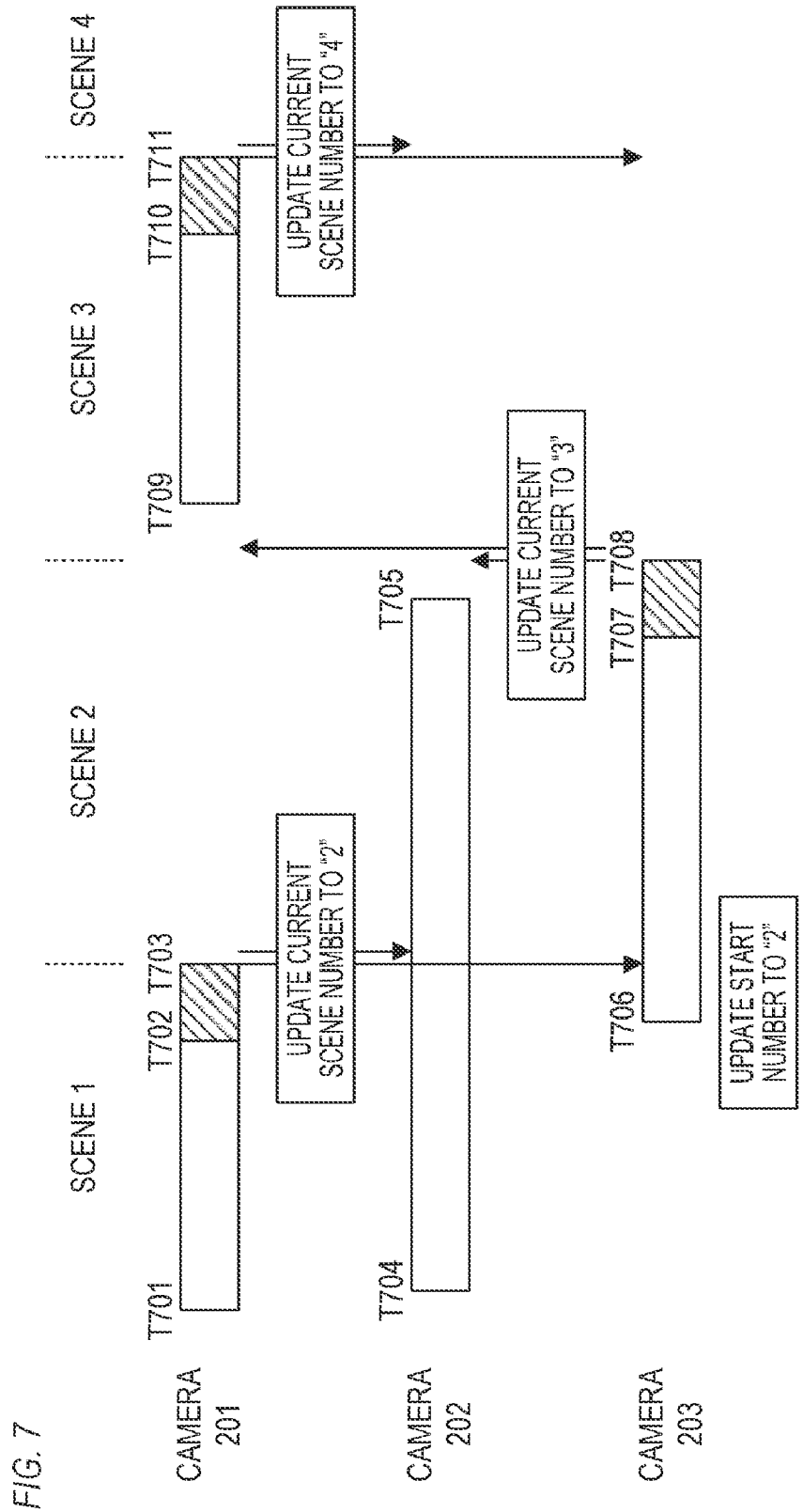

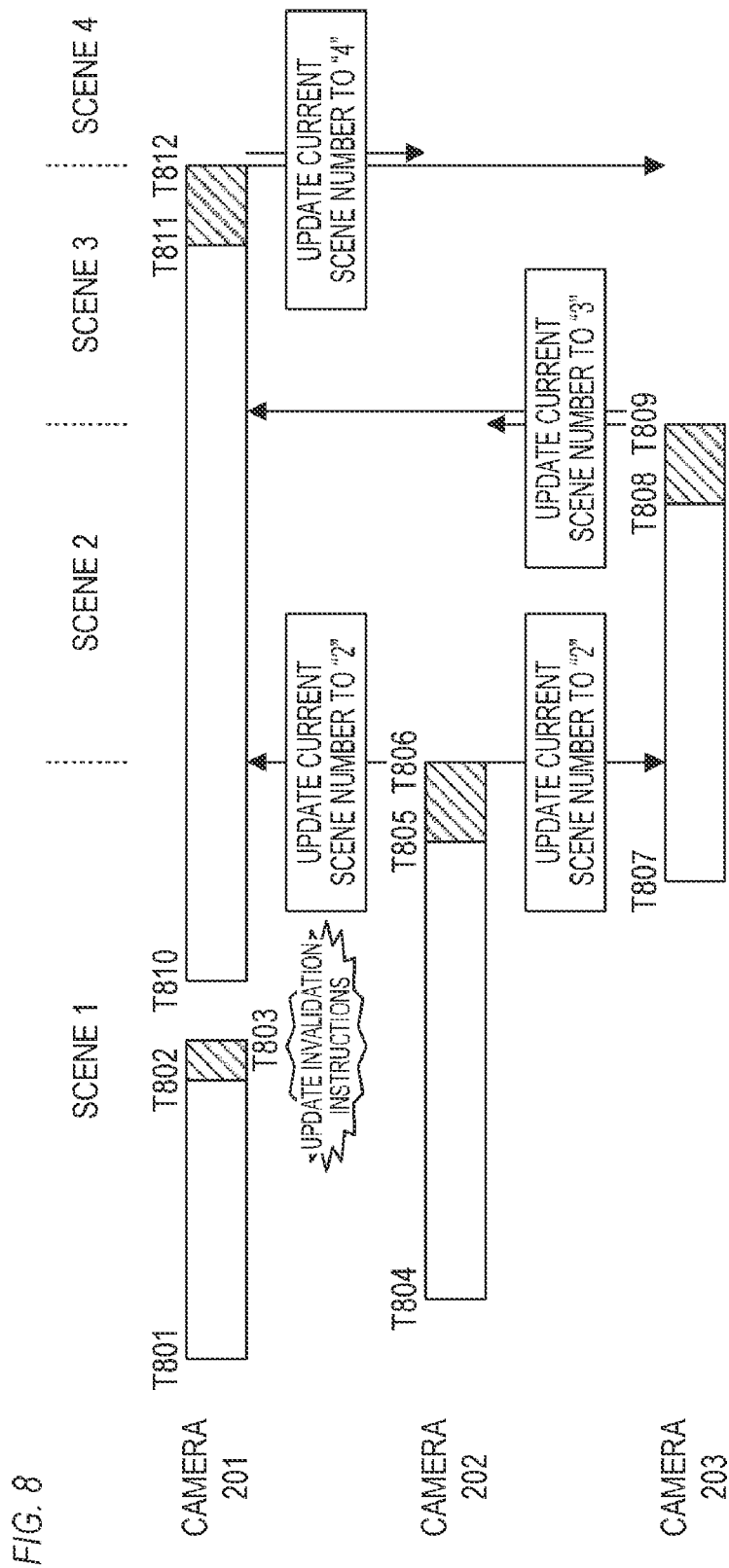

RECORDING DEVICE, IMAGING DEVICE, RECORDING METHOD, AND NON-TRANSITORY COMPUTER READABLE MEDIUM

BACKGROUND OF THE INVENTION

Field of the Invention

The present invention relates to a recording device and, in particular, to the assignment of a file name to recording data.

Description of the Related Art

Multi-photographing in which photographing is performed using a plurality of cameras has been known. A technology relating to the multi-photographing has been disclosed in, for example, Japanese Patent Application Laid-Open Publication No. 2016-66900 and Japanese Patent Application Laid-Open Publication No. 2005-198231. Japanese Patent Application Laid-Open Publication No. 2016-66900 discloses a method in which the respective cameras of an imaging control system specify a number used when the imaging control system records a photographed image at last and add a number obtained by adding a predetermined number to the specified number to a folder name or a file name of a newly-recorded photographed image. Japanese Patent Application Laid-Open Publication No. 2005-198231 discloses a method in which video data obtained by performing photographing using a plurality of video cameras is distinguished by file names based on photographing places or the like and managed.

However, in the method disclosed in Japanese Patent Application Laid-Open Publication No. 2016-66900 or Japanese Patent Application Laid-Open Publication No. 2005-198231, it is not possible to easily grasp which scene a recorded file corresponds to when one camera photographs moving images over a plurality of scenes. Therefore, it is not possible to easily select a file necessary at editing a moving image. A similar problem occurs, for example, when sound is recorded and edited as well as when a moving image is photographed and edited.

SUMMARY OF THE INVENTION

The present invention provides a technique of making it possible to easily grasp which scene a recorded file corresponds to even when recording is performed over a plurality of scenes.

A recording device comprising at least one memory and at least one processor which function as: a setting unit configured to set a scene number; a communication unit configured to perform transmission and reception of a scene number to share the scene number with at least one other recording device; and a recording unit configured to record a file of recording data with a file name including a scene number at a start of recording the recording data and a scene number at an end of recording the recording data.

Further features of the present invention will become apparent from the following description of embodiments with reference to the attached drawings.

BRIEF DESCRIPTION OF THE DRAWINGS

FIG. 6 is a timing chart showing an operation example of cameras;

FIG. 7 is a timing chart showing an operation example of the cameras; and

FIG. 8 is a timing chart showing an operation example of the cameras.

DESCRIPTION OF THE EMBODIMENTS

Hereinafter, embodiments of the present invention will be described in detail on the basis of the accompanying drawings. An example in which the present invention is applied to an imaging device (digital video camera) will be described, but the present invention is applicable to various recording devices such as recording machines that record sound.

Figure 1:
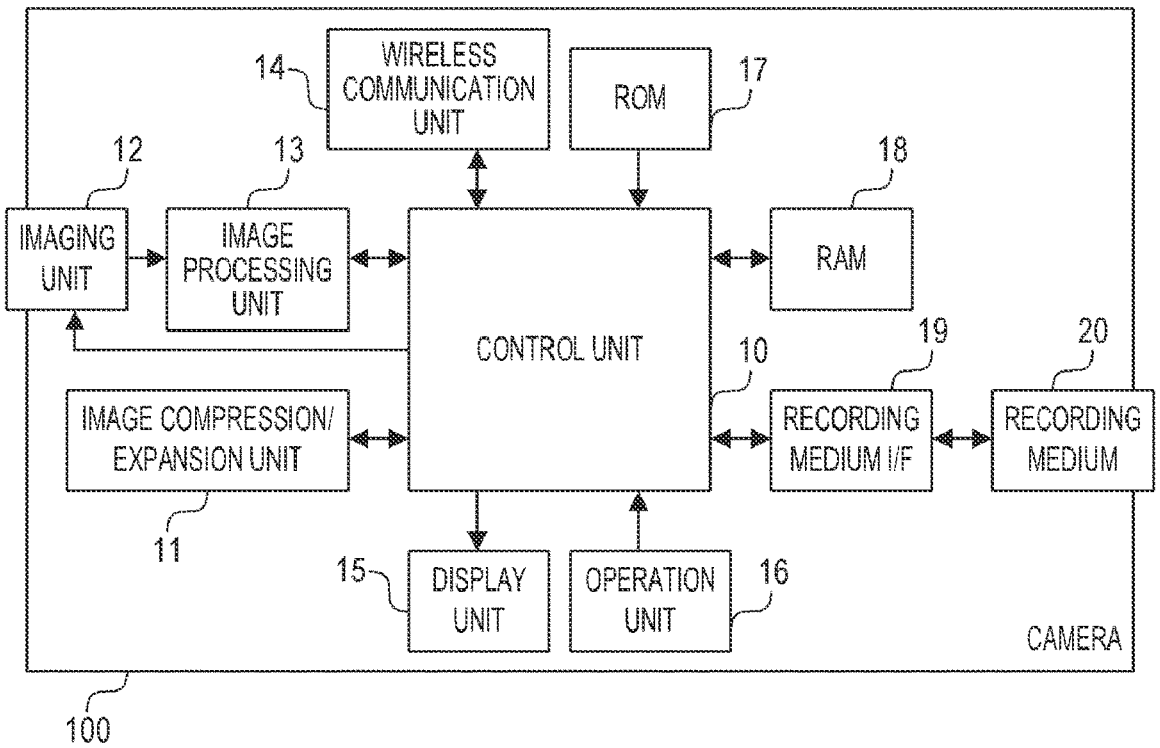
FIG. 1 is a block diagram showing a configuration example of a camera.

FIG. 1 is a block diagram showing a configuration example of a camera 100 as an example of a recording device to which the present invention is applicable. The camera 100 includes a control unit 10, an image compression/expansion unit 11, an imaging unit 12, an image processing unit 13, a wireless communication unit 14, a display unit 15, an operation unit 16, a ROM 17, a RAM 18, a recording medium I/F 19, and a recording medium 20. Respective constituting units other than the control unit 10 are connected to the control unit 10, and the control unit 10 and the respective constituting units are able to exchange data with each other as need be.

The control unit (CPU) 10 entirely controls the camera 100. The control unit 10 develops a program recorded on the ROM 17 into the RAM 18 and runs the same to control the respective constituting units and realize the operation of a flowchart that will be described later. The control unit 10 performs recording control to record a file of recording data (data of an image captured by the imaging unit 12 in the present embodiment) on the recording medium 20, display control to display a captured or recorded image on the display unit 15, or the like.

The ROM 17 is a non-volatile recording medium and stores a program that is run by the control unit 10. The RAM 18 is a volatile recording medium that is used as a work memory for the control unit 10. For example, the RAM 18 is used as a RAM that temporarily stores image data that is subjected to compression processing/expansion processing by the image compression/expansion unit 11 (such as image data that is captured by the imaging unit 12 and subjected to image processing by the image processing unit 13 and image data read from the recording medium 20). Further, the RAM 18 is used as a VRAM that temporarily stores image data to be displayed on the display unit 15. Moreover, the RAM 18 is used as a storage unit that temporarily stores additional information that is recorded in association with image data. The format of additional information is not particularly limited. For example, a markup language XML file (Extensible MarkUp Language file) is recorded as the file of additional information.

The recording medium I/F 19 is an interface to/from which the recording medium 20 for recording image data or the like is attachable/detachable. For example, the recording medium 20 is a memory card such as an SD card, and the recording medium I/F 19 has a slot through which the memory card is insertable and extractable. FIG. 1 shows a state in which the recording medium 20 is attached to the recording medium I/F 19. A configuration using the recording medium 20 attachable to and detachable from the camera 100 is described above, but the recording medium 20 may be a memory included in the camera 100, or the like.

The image processing unit 13 subjects predetermined image processing (such as pixel interpolation processing, resize processing, and color conversion processing) to image data captured by the imaging unit 12. Further, the image processing unit 13 performs predetermined computation processing using captured image data, and the control unit 10 performs various control (such as exposure control and automatic white balance control) relating to imaging by the imaging unit 12 on the basis of an obtained computation result.

The image compression/expansion unit 11 performs compression processing to compress image data subjected to image processing by the image processing unit 13 or expansion processing to expand image data read from the recording medium 20.

The imaging unit 12 has a photographing lens (including a zoom lens and a focus lens) and an imaging element, captures an object on the basis of the control of the control unit 10, and acquires image data such as still-image data and moving-image data.

The display unit 15 displays various setting states, an image captured by the imaging unit 12, an image read from the recording medium 20 and reproduced, or the like on the basis of the control of the control unit 10. The display unit 15 may be a look-in-type in-finder display or a rear display outside a finder. The display unit 15 may be a rear display (for example, a vari-angle system rear display) of which the posture relative to the body part of the camera 100 is changeable, or a rear display of which the posture relative to the body part of the camera 100 is fixed.

The operation unit 16 includes a power switch for turning ON/OFF the power of the camera 100, a photographing start button, a mode switching button for switching an operation mode such as a camera mode (photographing mode) and a reproduction mode, or the like and is a reception unit that receives an operation from a user. When a touch panel is included in the operation unit 16, the control unit 10 is allowed to detect the following operations on the touch panel.

An operation in which a finger or a pen newly touches the touch panel (hereinafter called touch-down).

An operation in which a finger or a pen is put in touch with the touch panel (hereinafter called touch-on).

An operation in which a finger or a pen is moved while being put in touch with the touch panel (hereinafter called move).

An operation in which a finger or a pen put in touch with the touch panel is released from the touch panel (hereinafter called touch-up).

An operation in which nothing is put in touch with the touch panel (hereinafter called touch-off).

The control unit 10 is notified of these operations or position coordinates on the touch panel at which a finger or a pen has touched, and determines what operation has been performed on the touch panel on the basis of the notified information. As for the move, it is possible to determine a movement direction in which a finger or a pen moves on the touch panel for each perpendicular component and each horizontal component on the basis of a change in position coordinates.

When the touch-up is performed in succession to the touch-down via the move, it is considered that a stroke is drawn. The operation of drawing a stroke as quickly as possible is called a flick. The flick is the operation of quickly moving a finger or a pen for a certain distance while touching the touch panel and then releasing the finger or the pen from the touch panel. In other words, the flick is the operation of quickly tracing the touch panel so as to be flicked by a finger or a pen. When the fact that a finger or a pen has moved at at least a predetermined speed for at least a predetermined distance is detected and the touch-up is detected in this state, it is possible to determine that the flick has been performed. Further, when the fact that a finger or a pen has moved at a speed less than a predetermined speed for at least a predetermined distance is detected, it is determined that dragging has been performed.

Among various systems such as a resistance film system, an electrostatic capacity system, a surface acoustic wave system, an infrared system, an electromagnetic induction system, an image recognition system, and an optical sensor system, any type of a touch panel may be used.

The wireless communication unit 14 performs the transmission and reception of data with external equipment such as an external camera and a personal computer through wireless communication on the basis of the control of the control unit 10. The wireless communication unit 14 transmits, for example, setting information, operation information, or the like of the camera 100 to an outside and receives a command for operating the camera 100, additional information recorded together with image data, or the like. Transmittable/receivable data includes digital image data, an analog video signal, additional information, or the like. The wireless communication system of the wireless communication unit 14 is not particularly limited. For example, Wi-Fi, Bluetooth, radio wave communication, infrared communication, or the like is available.

Figure 2:
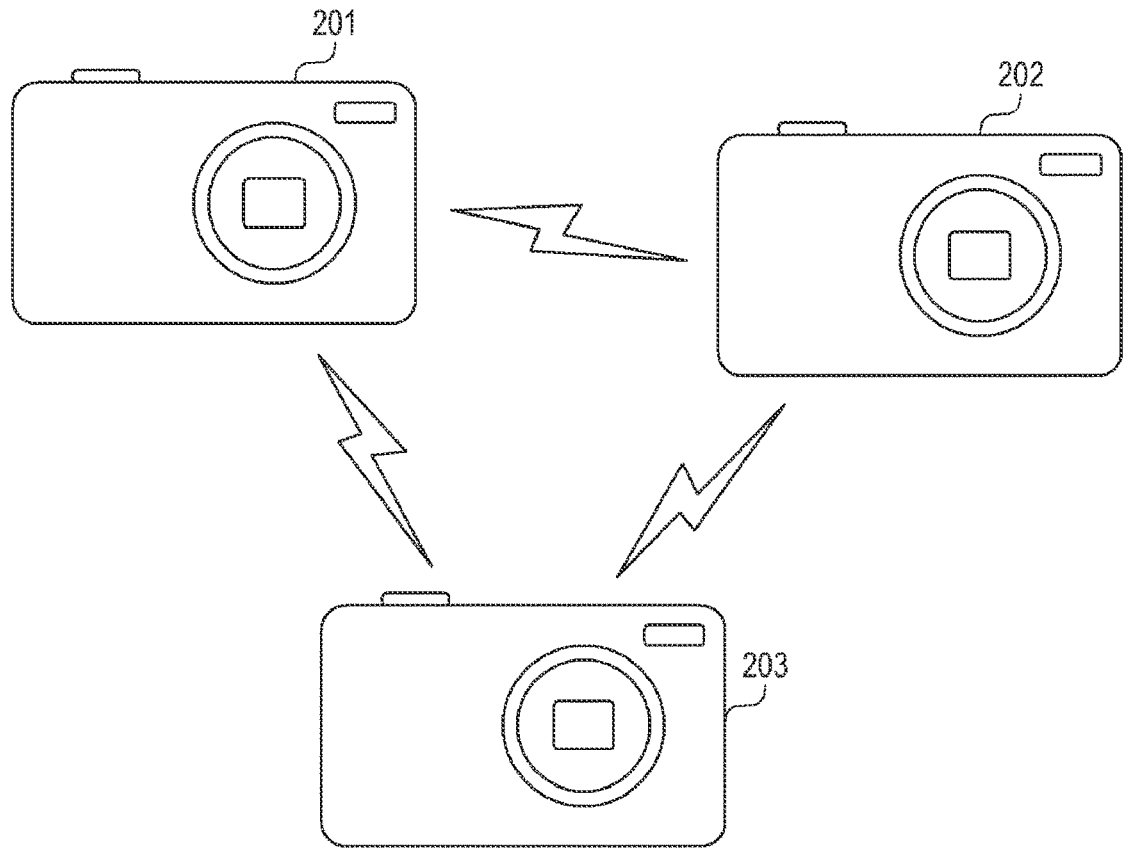
FIG. 2 is a schematic view showing a configuration example of a photographing system.

FIG. 2 is a schematic view showing a configuration example of a photographing system (recording system) according to the present embodiment. The photographing system according to the present embodiment includes a plurality of cameras. The number of the cameras is not particularly limited. In the example of FIG. 2, three cameras 201 to 203 are used. Each of the cameras 201 to 203 has the same configuration as that of the camera 100 in FIG. 1. The cameras 201 to 203 are connected to be able to communicate with each other through their wireless communication units 14. The communication between the cameras 201 to 203 may be wired communication.

Figure 3:
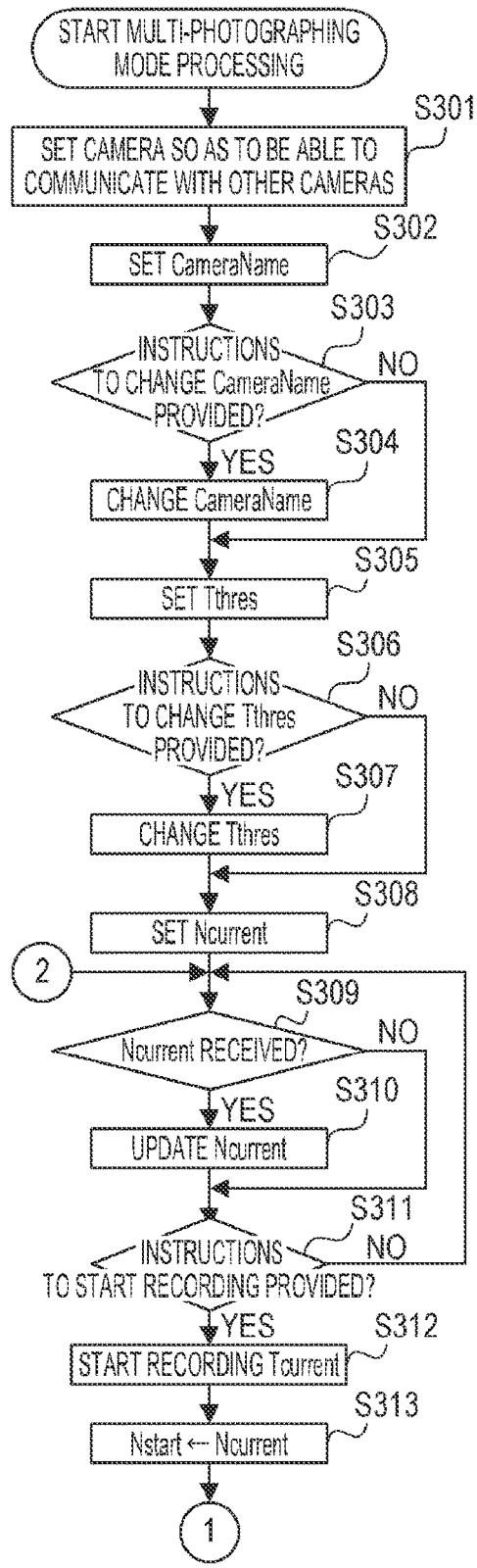
FIG. 3 is a flowchart showing an example of multi-photographing mode processing.
Figure 3:
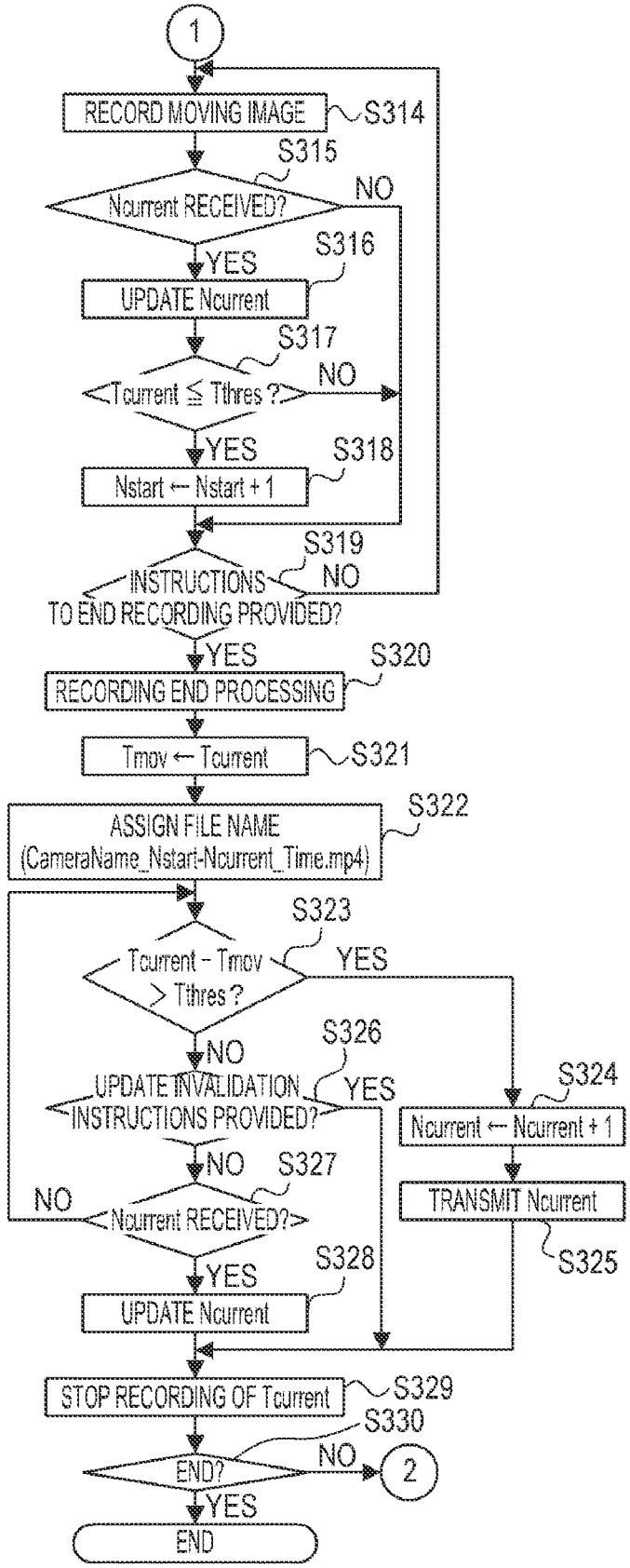

FIG. 3 is a flowchart showing an example of the operation (multi-photographing mode processing) of the camera 100 in a multi-photographing mode. The operation is realized when the control unit 10 develops a program recorded on the ROM 17 into the RAM 18 and runs the same. The operation of FIG. 3 starts, for example, when the camera 100 is activated in the multi-photographing mode or when the mode of the camera 100 is switched to the multi-photographing mode.

In S301, the control unit 10 controls the wireless communication unit 14 to set the camera 100 so as to be able to perform wireless communication with other cameras in the photographing system. For example, when the camera 100 is the camera 201 in FIG. 2, the control unit 10 of the camera 201 controls the wireless communication unit 14 of the camera 201 to set the camera 201 to be able to perform wireless communication with the cameras 202 and 203. When the respective cameras in the photographing system perform the processing, the wireless communication between all the cameras in the photographing system is made possible.

In step S302, the control unit 10 sets a camera name CameraName representing a name of the camera 100. For example, the control unit 10 sets a default name to the camera name CameraName.

In step S303, the control unit 10 determines whether a user has provided instructions to change the camera name CameraName. The processing proceeds to S304 when the user has provided the instructions. Otherwise, the processing proceeds to S305.

In S304, the control unit 10 changes (updates) a name set in the camera name CameraName to a name specified by the user.

In S305, the control unit 10 sets a scene determination allowable time Tthres. For example, the control unit 10 sets a default time as the scene determination allowable time Tthres. The scene determination allowable time Tthres is used to update a current scene number Ncurrent (current scene number) after the recording of a moving image by the camera 100 (a moving image captured by the imaging unit 12) ends. As will be described in detail later, the current scene number Ncurrent is updated with the elapse of the scene determination allowable time Tthres after the end of recording a moving image in the present embodiment. Time set as the scene determination allowable time Tthres is not particularly limited but is, for example, 1 to 5 seconds. In the present embodiment, the scene determination allowable time Tthres is also used to determine a scene number (start number Nstart) corresponding to the head of a moving image recorded by the camera 100. Note that a predetermined time different from the scene determination allowable time Tthres may be used to determine the start number Nstart.

In S306, the control unit 10 determines whether the user has provided instructions to change the scene determination allowable time Tthres. The processing proceeds to S307 when the user has provided the instructions. Otherwise, the processing proceeds to S308.

In S307, the control unit 10 changes (updates) a time set in the scene determination allowable time Tthres to a time specified by the user.

In S308, the control unit 10 sets a current scene number Ncurrent. For example, the control unit 10 sets a default number (such as "001") as the current scene number Ncurrent. When one camera is set as a host camera and remaining cameras are set as guest cameras in the photographing system, the processing of S308 may be performed only by the host camera. For example, the host camera sets a default number or a number specified by the user as the current scene number Ncurrent and notifies the guest cameras of the current scene number Ncurrent. Since there is also a possibility that a guest camera is added later, the guest camera may request the host camera to provide the current scene number Ncurrent.

In S309, the control unit 10 determines whether a current scene number Ncurrent has been received from other cameras in the photographing system via the wireless communication unit 14. The processing proceeds to S310 when the current scene number Ncurrent has been received. Otherwise, the processing proceeds to S311.

In S310, the control unit 10 changes (updates) the current scene number Ncurrent of the camera 100 to the current scene number received from other cameras in the photographing system.

As in the processing of S309, the transmission/reception of the current scene number Ncurrent is performed between the plurality of cameras in the photographing system in the present embodiment. Further, as in the processing of S310, the current scene number Ncurrent is shared between the plurality of cameras in the photographing system in the present embodiment.

In S311, the control unit 10 determines whether the user has provided instructions to start recording a moving image (photographing start instructions). The processing proceeds to S312 when the user has provided the instructions to start recording. Otherwise, the processing proceeds to S309.

In S312, the control unit 10 starts counting a time and starts recording an elapsed time Tcurrent since the start of the counting.

In S313, the control unit 10 sets the current scene number Ncurrent as a start number Nstart.

In S314, the control unit 10 records the moving image (photographing processing). The control unit 10 records a file of the moving image on the recording medium 20 via the recording medium I/F 19.

In S315, the control unit 10 determines whether a current scene number Ncurrent has been received from other cameras in the photographing system via the wireless communication unit 14. The processing proceeds to S316 when the current scene number Ncurrent has been received. Otherwise, the processing proceeds to S319.

In S316, the control unit 10 changes (updates) the current scene number Ncurrent of the camera 100 to the current scene number received from other cameras in the photographing system.

In S317, the control unit 10 determines whether the elapsed time Tcurrent is not more than the scene determination allowable time Tthres. The processing proceeds to S318 when the elapsed time Tcurrent is not more than the scene determination allowable time Tthres. Otherwise, the processing proceeds to S319.

In S318, the control unit 10 increments the value of the start number Nstart by one. When the elapsed time Tcurrent is not more than the scene determination allowable time Tthres, a scene is switched immediately after the start of the moving image that is being recorded. In this case, the second scene of the moving image is preferably regarded as the first (head) scene of the moving image. Therefore, in the present embodiment, the start number Nstart is incremented by one so that the second scene of the moving image is regarded as the first scene of the moving image when the elapsed time Tcurrent is not more than the scene determination allowable time Tthres. Thus, it is possible to prevent a head scene number of the head scene slightly included in the moving image from being set as the start number Nstart.

In S319, the control unit 10 determines whether the user has provided instructions to end the recording of the moving image (photographing end instructions). The processing proceeds to S320 when the user has provided the instructions. Otherwise, the processing proceeds to S314.

In S320, the control unit 10 performs recording end processing to end the recording of the moving image (photographing end processing).

In S321, the control unit 10 sets the elapsed time Tcurrent as a moving image time Tmov representing the time of the moving image that has been recorded on the recording medium 20.

Figure 4:
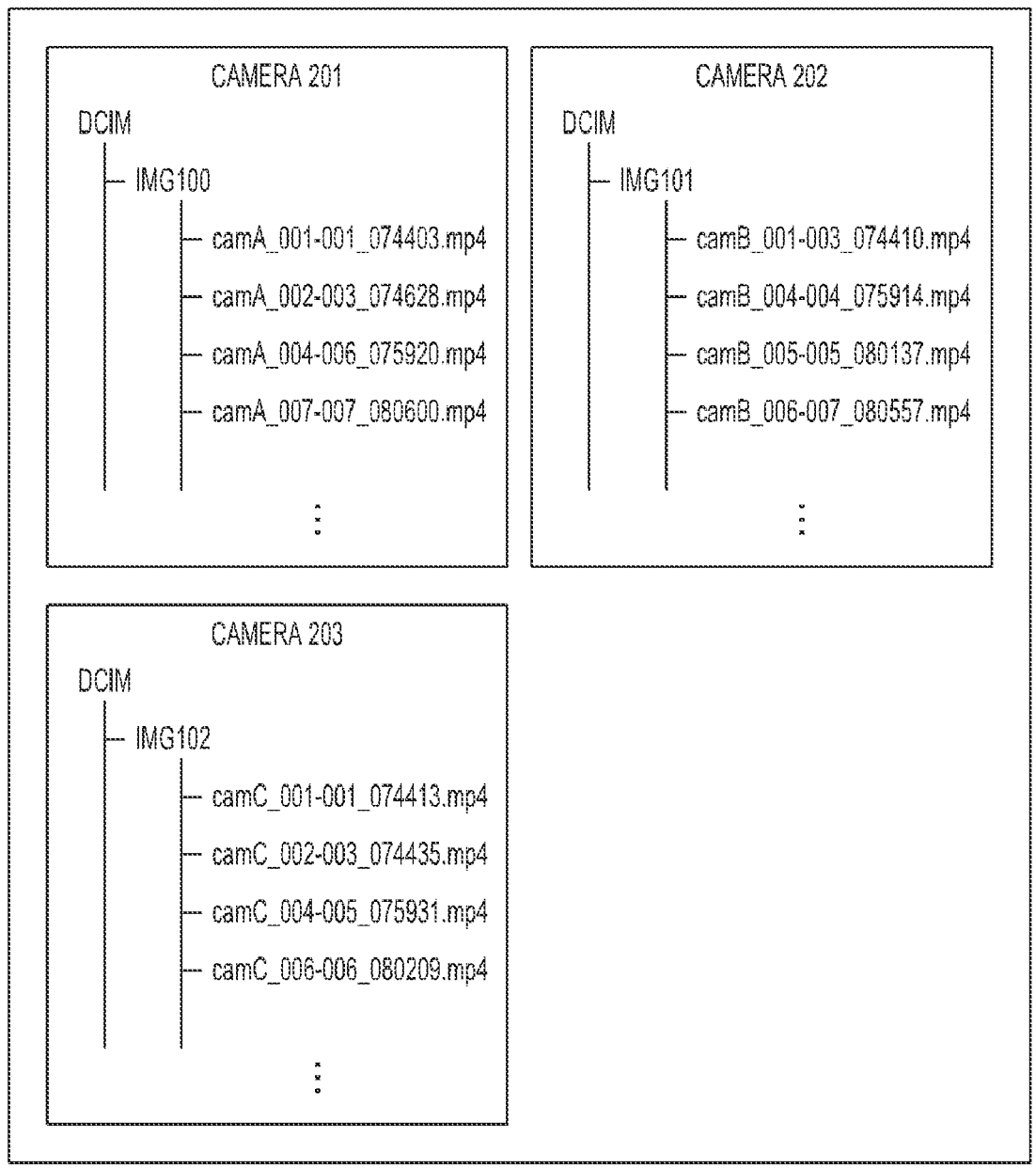
FIG. 4 is a schematic view showing an example of a file name of a moving image.

In S322, the control unit 10 assigns a file name including the start number Nstart and the current scene number Ncurrent to the file of the moving image that has been recorded on the recording medium 20. In the file name of the moving image, the start number Nstart may be grasped as a scene number at the start of recording the moving image, and the current scene number Ncurrent may be grasped as a scene number at the end of the recording of the moving image. In the present embodiment, the control unit 10 assigns a file name including the camera name CameraName, the start number Nstart, and the current scene number Ncurrent to the file of the moving image. For example, the control unit 10 assigns a file name "CameraName_Nstart-Ncurrent_Time.mp4" to the file of the moving image. "Time" represents time (hour, minutes, seconds) at which the recording of a moving image has started, and may be obtained from, for example, a clock included in the camera 100. FIG. 4 shows an example of file names of moving images recorded by the cameras 201 to 203 in FIG. 2. Information such as years, months, and dates at which the recording of the moving images has started may be included in the file names.

In S323, the control unit 10 determines whether an elapsed time (Tcurrent−Tmov) after the end of recording the moving image has exceeded the scene determination allowable time Tthres. The processing proceeds to S324 when the elapsed time after the end of recording the moving image has exceeded the scene determination allowable time Tthres. Otherwise, the processing proceeds to S326.

In S324, the control unit 10 increments the value of the current scene number Ncurrent by one.

In S325, the control unit 10 transmits the current scene number Ncurrent to other cameras in the photographing system via the wireless communication unit 14.

Figure 5:
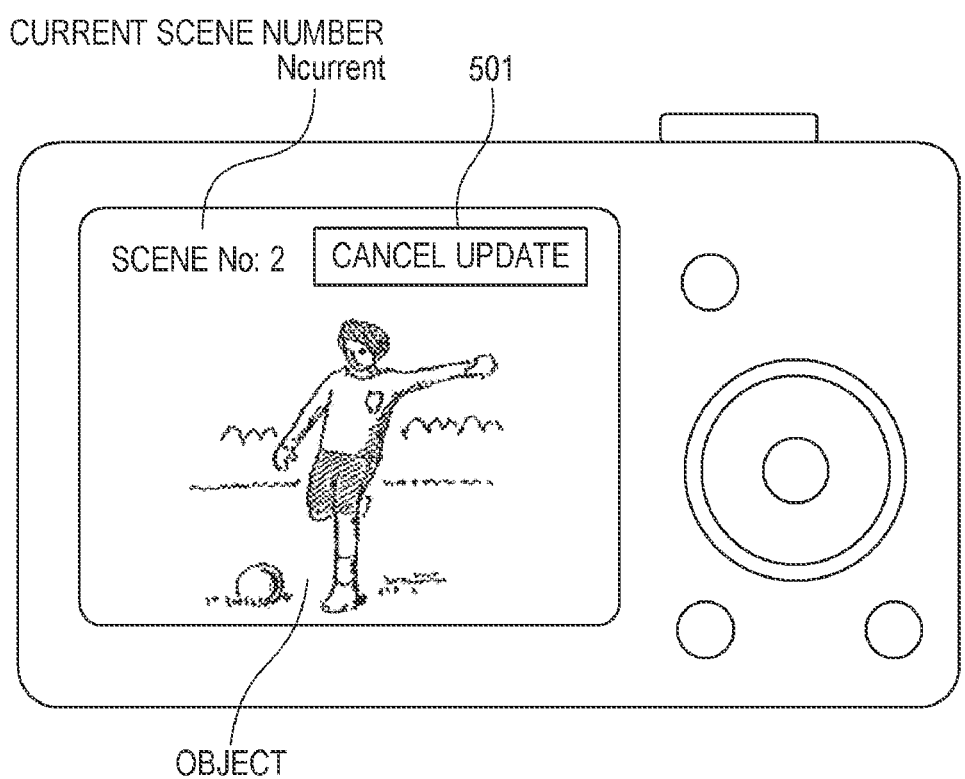
FIG. 5 is a schematic view showing an example of a screen displayed after recording a moving image.

In S326, the control unit 10 determines whether the user has provided instructions to invalidate the update of the current scene number Ncurrent. The processing proceeds to S329 when the user has provided the update invalidation instructions. Otherwise, the processing proceeds to S327. The update invalidation instructions are (invalidation) instructions so as not to perform the update of the current scene number Ncurrent, that is, the processing of S324 with the elapse of the scene determination allowable time Tthres after the end of recording the moving image. FIG. 5 shows an example of a screen displayed by the display unit 15 after the recording of a moving image. In FIG. 5, an object, a current scene number Ncurrent, and an update cancel button 501 are displayed. For example, the update cancel button 501 is displayed until a scene determination allowable time Tthres elapses after the end of recording a moving image. The user is allowed to provide the update invalidation instructions through a predetermined operation such as the specification of the update cancel button 501.

In S327, the control unit 10 determines whether a current scene number Ncurrent has been received from other cameras in the photographing system via the wireless communication unit 14. The processing proceeds to S328 when the current scene number Ncurrent has been received. Otherwise, the processing proceeds to S323.

In S328, the control unit 10 changes (updates) the current scene number Ncurrent of the camera 100 to the current scene number received from other cameras in the photographing system.

As described above, the control unit 10 updates a current scene number Ncurrent with the elapse of a scene determination allowable time Tthres after the end of recording a moving image in the present embodiment. However, when a current scene number Ncurrent is received from other cameras before the elapse of the scene determination allowable time Tthres, the control unit 10 updates the current scene number Ncurrent to the received current scene number Ncurrent but does not update the current scene number Ncurrent with the elapse of the scene determination allowable time Tthres. This is because a possibility that a scene switches a plurality of times in a short period of time such as the scene determination allowable time Tthres is extremely low. And when the user has provided the update invalidation instructions before the elapse of the scene determination allowable time Tthres, the control unit 10 does not update the current scene number Ncurrent with the elapse of the scene determination allowable time Tthres.

In S329, the control unit 10 stops (ends) counting the time and stops recording the elapsed time Tcurrent.

In S330, the control unit 10 determines whether multi-photographing mode processing is ended. The control unit 10 ends the multi-photographing mode processing when determining that the multi-photographing mode processing is ended. Otherwise, the processing proceeds to S309. The control unit 10 determines that the multi-photographing mode processing is ended when the user has provided instructions to turn off the power of the camera 100 or when the user has provided instructions to switch the mode of the camera 100 to another mode.

Note when a situation in which the continuation of photographing becomes difficult such as a power OFF state due to a dead battery and an increase in the temperature of a camera and the non-recordable state of the recording medium 20 occurs during the multi-photographing mode processing, the processing proceeds to S329 after the file name assignment processing of S322 is performed.

FIG. 6 is a timing chart showing an operation example of the cameras 201 to 203 in FIG. 2. It is assumed that a camera name CameraName=camA is set in the camera 201, a camera name CameraName=camB is set in the camera 202, and a camera name CameraName=camC is set in the camera 203. The camera names CameraName are set in S302 of FIG. 3. Further, it is assumed that a current scene number Ncurrent=1 is set in each of the cameras 201 to 203. The current scene number Ncurrent=1 is set in S308.

At a timing T601 at which instructions to start recording are provided, the camera 201 starts counting an elapsed time Tcurrent (S312), sets a current scene number Ncurrent=1 as a start number Nstart (S313), and starts recording a moving image (S314 to S319). Then, at a timing T602 at which instructions to end the recording are provided, the camera 201 ends the recording of the moving image (S320), sets the elapsed time Tcurrent as a moving image time Tmov (S321), and assigns a file name to a file of the recorded moving image (S322). Since the camera 201 has not received a current scene number Ncurrent from the cameras 202 and 203 during the recording of the moving image or at the end of the recording, the start number Nstart and the current scene number Ncurrent remain at "1." Therefore, the camera 201 assigns a file name "camA_001-001_T601 (hour, minute, second).mp4" to the file of the recorded moving image.

After that, at a timing T603 at which an elapsed time (Tcurrent−Tmov) after the end of recording the moving image has exceeded a scene determination allowable time Tthres, the camera 201 updates the current scene number Ncurrent to "2" (S324). Then, the camera 201 transmits the current scene number Ncurrent=2 to the cameras 202 and 203 (S325). The cameras 202 and 203 update their own current scene numbers Ncurrent to the current scene number Ncurrent=2 received from the camera 201 (S310).

At a timing T604 at which instructions to start recording are provided, the camera 202 starts counting an elapsed time Tcurrent (S312), sets a current scene number Ncurrent as a start number Nstart (S313), and starts recording a moving image (S314 to S319). Since the timing T604 is a timing after the timing T603, the current scene number Ncurrent=2 is set as the start number Nstart. Then, at a timing T605 at which instructions to end the recording are provided, the camera 202 ends the recording of the moving image (S320), sets the elapsed time Tcurrent as a moving image time Tmov (S321), and assigns a file name to a file of the recorded moving image (S322). Since the camera 202 has not received a current scene number Ncurrent from the cameras 201 and 203 during the recording of the moving image or at the end of the recording, the start number Nstart and the current scene number Ncurrent remain at "2." Therefore, the camera 202 assigns a file name "camB_002-002_T604 (hour, minute, second).mp4" to the file of the recorded moving image.

After that, at a timing T606 at which an elapsed time (Tcurrent−Tmov) after the end of recording the moving image has exceeded the scene determination allowable time Tthres, the camera 202 updates the current scene number Ncurrent to "3" (S324). Then, the camera 202 transmits the current scene number Ncurrent=3 to the cameras 201 and 203 (S325). The cameras 201 and 203 update their own current scene numbers Ncurrent to the current scene number Ncurrent=3 received from the camera 202 (S310).

At a timing T607 at which instructions to start recording are provided, the camera 203 starts counting an elapsed time Tcurrent (S312), sets a current scene number Ncurrent as a start number Nstart (S313), and starts recording a moving image (S314 to S319). Since the timing T607 is a timing after the timing T606, the current scene number Ncurrent=3 is set as the start number Nstart. Then, at a timing T608 at which instructions to end the recording are provided, the camera 203 ends the recording of the moving image (S320), sets the elapsed time Tcurrent as a moving image time Tmov (S321), and assigns a file name to a file of the recorded moving image (S322). Since the camera 203 has not received a current scene number Ncurrent from the cameras 201 and 202 during the recording of the moving image or at the end of the recording, the start number Nstart and the current scene number Ncurrent remain at "3." Therefore, the camera 203 assigns a file name "camC_003-003_T607 (hour, minute, second).mp4" to the file of the recorded moving image.

After that, at a timing T609 at which an elapsed time (Tcurrent−Tmov) after the end of recording the moving image has exceeded the scene determination allowable time Tthres, the camera 203 updates the current scene number Ncurrent to "4" (S324). Then, the camera 203 transmits the current scene number Ncurrent=4 to the cameras 201 and 202 (S325). The cameras 201 and 202 update their own current scene numbers Ncurrent to the current scene number Ncurrent=4 received from the camera 203 (S310).

FIG. 7 is a timing chart showing another operation example of the cameras 201 to 203 in FIG. 2. Here, it is also assumed that a camera name CameraName=camA is set in the camera 201, a camera name CameraName=camB is set in the camera 202, and a camera name CameraName=camC is set in the camera 203. Further, it is assumed that a current scene number Ncurrent=1 is set in each of the cameras 201 to 203.

At a timing T701 at which instructions to start recording are provided, the camera 201 starts counting an elapsed time Tcurrent (S312), sets a current scene number Ncurrent=1 as a start number Nstart (S313), and starts recording a moving image (S314 to S319). Then, at a timing T702 at which instructions to end the recording are provided, the camera 201 ends the recording of the moving image (S320), sets the elapsed time Tcurrent as a moving image time Tmov (S321), and assigns a file name to a file of the recorded moving image (S322). Since the camera 201 has not received a current scene number Ncurrent from the cameras 202 and 203 during the recording of the moving image or at the end of the recording, the start number Nstart and the current scene number Ncurrent remain at "1." Therefore, the camera 201 assigns a file name "camA_001-001_T701 (hour, minute, second).mp4" to the file of the recorded moving image.

After that, at a timing T703 at which an elapsed time (Tcurrent−Tmov) after the end of recording the moving image has exceeded a scene determination allowable time Tthres, the camera 201 updates the current scene number Ncurrent to "2" (S324). Then, the camera 201 transmits the current scene number Ncurrent=2 to the cameras 202 and 203 (S325). The cameras 202 and 203 update their own current scene numbers Ncurrent to the current scene number Ncurrent=2 received from the camera 201 (S310).

At a timing T704 at which instructions to start recording are provided, the camera 202 starts counting an elapsed time Tcurrent (S312), sets a current scene number Ncurrent as a start number Nstart (S313), and starts recording a moving image (S314 to S319). Since the timing T704 is a timing before the timing T703, the current scene number Ncurrent=1 is set as the start number Nstart. Then, at a timing T705 at which instructions to end the recording are provided, the camera 202 ends the recording of the moving image (S320), sets the elapsed time Tcurrent as a moving image time Tmov (S321), and assigns a file name to a file of the recorded moving image (S322). The camera 202 receives the current scene number Ncurrent=2 from the camera 201 and updates its own current scene number Ncurrent to "2" at the timing T703 during the recording of the moving image (S316). The start number Nstart remains at "1." Therefore, the camera 202 assigns a file name "camB_001-002_T704 (hour, minute, second).mp4" to the file of the recorded moving image.

After that, at a timing T708 before the scene determination allowable time Tthres elapses after the end of recording the moving image, the camera 202 receives a current scene number Ncurrent=3 from the camera 203. Then, the camera 202 updates its own current scene number Ncurrent to the current scene number Ncurrent=3 received from the camera 203 (S328). The camera 202 does not update the current scene number Ncurrent with the elapse of the scene determination allowable time Tthres.

At a timing T706 at which instructions to start recording are provided, the camera 203 starts counting an elapsed time Tcurrent (S312), sets a current scene number Ncurrent as a start number Nstart (S313), and starts recording a moving image (S314 to S319). Since the timing T706 is a timing before the timing T703, the current scene number Ncurrent=1 is set as the start number Nstart. Next, the camera 203 receives the current scene number Ncurrent=2 from the camera 201 at the timing T703 and updates its own current scene number Ncurrent to "2" (S316). The timing T703 is a timing before the scene determination allowable time Tthres elapses since the timing T706. In other words, the elapsed time Tcurrent at the timing T703 is not more than the scene determination allowable time Tthres. Therefore, the camera 203 updates the start number Nstart to "2" (S318). Then, at a timing T707 at which instructions to end the recording are provided, the camera 203 ends the recording of the moving image (S320), sets the elapsed time Tcurrent as a moving image time Tmov (S321), and assigns a file name to a file of the recorded moving image (S322). Since the camera 203 has not received a current scene number Ncurrent from the cameras 201 and 202 at the timing T703 and thereafter, the start number Nstart and the current scene number Ncurrent remain at "2." Therefore, the camera 203 assigns a file name "camC_002-002_T706 (hour, minute, second).mp4" to the file of the recorded moving image.

After that, at a timing T708 at which an elapsed time (Tcurrent−Tmov) after the end of recording the moving image has exceeded the scene determination allowable time Tthres, the camera 203 updates the current scene number Ncurrent to "3" (S324). Then, the camera 203 transmits the current scene number Ncurrent=3 to the cameras 201 and 202 (S325). The cameras 201 and 202 update their own current scene numbers Ncurrent to the current scene number Ncurrent=3 received from the camera 203.

At a timing T709 at which instructions to start recording are provided, the camera 201 starts counting an elapsed time Tcurrent again (S312), sets a current scene number Ncurrent as a start number Nstart (S313), and starts recording a moving image (S314 to S319). Since the timing T709 is a timing after the timing T708, the current scene number Ncurrent=3 is set as the start number Nstart. Then, at a timing T710 at which instructions to end the recording are provided, the camera 201 ends the recording of the moving image (S320), sets the elapsed time Tcurrent as a moving image time Tmov (S321), and assigns a file name to a file of the recorded moving image (S322). Since the camera 201 has not received a current scene number Ncurrent from the cameras 202 and 203 during the recording of the moving image or at the end of the recording, the start number Nstart and the current scene number Ncurrent remain at "3." Therefore, the camera 201 assigns a file name "camA_003-003_T709 (hour, minute, second).mp4" to the file of the recorded moving image.

After that, at a timing T711 at which an elapsed time (Tcurrent−Tmov) after the end of recording the moving image has exceeded the scene determination allowable time Tthres, the camera 201 updates the current scene number Ncurrent to "4" (S324). Then, the camera 201 transmits the current scene number Ncurrent=4 to the cameras 202 and 203 (S325). The cameras 202 and 203 update their own current scene numbers Ncurrent to the current scene number Ncurrent=4 received from the camera 201 (S310).

FIG. 8 is a timing chart showing another operation example of the cameras 201 to 203 in FIG. 2. Here, it is also assumed that a camera name CameraName=camA is set in the camera 201, a camera name CameraName=camB is set in the camera 202, and a camera name CameraName=camC is set in the camera 203. Further, it is assumed that a current scene number Ncurrent=1 is set in each of the cameras 201 to 203.

At a timing T801 at which instructions to start recording are provided, the camera 201 starts counting an elapsed time Tcurrent (S312), sets a current scene number Ncurrent=1 as a start number Nstart (S313), and starts recording a moving image (S314 to S319). Then, at a timing T802 at which instructions to end the recording are provided, the camera 201 ends the recording of the moving image (S320), sets the elapsed time Tcurrent as a moving image time Tmov (S321), and assigns a file name to a file of the recorded moving image (S322). Since the camera 201 has not received a current scene number Ncurrent from the cameras 202 and 203 during the recording of the moving image or at the end of the recording, the start number Nstart and the current scene number Ncurrent remain at "1." Therefore, the camera 201 assigns a file name "camA_001-001_T801 (hour, minute, second).mp4" to the file of the recorded moving image.

After that, at a timing T803 before a scene determination allowable time Tthres elapses after the end of recording the moving image, the user of the camera 201 provides instructions to invalidate the update of the current scene number Ncurrent (YES in S326). Therefore, the camera 201 does not update the current scene number Ncurrent with the elapse of the scene determination allowable time Tthres.

At a timing T804 at which instructions to start recording are provided, the camera 202 starts counting an elapsed time Tcurrent (S312), sets a current scene number Ncurrent=1 as a start number Nstart (S313), and starts recording a moving image (S314 to S319). Then, at a timing T805 at which instructions to end the recording are provided, the camera 202 ends the recording of the moving image (S320), sets the elapsed time Tcurrent as a moving image time Tmov (S321), and assigns a file name to a file of the recorded moving image (S322). Since the camera 202 has not received a current scene number Ncurrent from the cameras 201 and 203 during the recording of the moving image or at the end of the recording, the start number Nstart and the current scene number Ncurrent remain at "1." Therefore, the camera 202 assigns a file name "camB_001-001_T804 (hour, minute, second).mp4" to the file of the recorded moving image.

After that, at a timing T806 at which an elapsed time (Tcurrent−Tmov) after the end of recording the moving image has exceeded the scene determination allowable time Tthres, the camera 202 updates the current scene number Ncurrent to "2" (S324). Then, the camera 202 transmits the current scene number Ncurrent=2 to the cameras 201 and 203 (S325). The cameras 201 and 203 update their own current scene numbers Ncurrent to the current scene number Ncurrent=2 received from the camera 202.

At a timing T807 at which instructions to start recording are provided, the camera 203 starts counting an elapsed time Tcurrent (S312), sets a current scene number Ncurrent as a start number Nstart (S313), and starts recording a moving image (S314 to S319). Since the timing T807 is a timing before the timing T806, the current scene number Ncurrent=1 is set as the start number Nstart. Then, at a timing T808 at which instructions to end the recording are provided, the camera 203 ends the recording of the moving image (S320), sets the elapsed time Tcurrent as a moving image time Tmov (S321), and assigns a file name to a file of the recorded moving image (S322). The camera 203 receives the current scene number Ncurrent=2 from the camera 202 and updates its own current scene number Ncurrent to "2" at the timing T806 during the recording of the moving image (S316). The start number Nstart remains at "1." Therefore, the camera 203 assigns a file name "camC_001-002_T807 (hour, minute, second).mp4" to the file of the recorded moving image.

After that, at a timing T809 at which an elapsed time (Tcurrent−Tmov) after the end of recording the moving image has exceeded the scene determination allowable time Tthres, the camera 203 updates the current scene number Ncurrent to "3" (S324). Then, the camera 203 transmits the current scene number Ncurrent=3 to the cameras 201 and 202 (S325). The cameras 201 and 202 update their own current scene numbers Ncurrent to the current scene number Ncurrent=3 received from the camera 203.

At a timing T810 at which instructions to start recording are provided, the camera 201 starts counting an elapsed time Tcurrent (S312), sets a current scene number Ncurrent as a start number Nstart (S313), and starts recording a moving image again (S314 to S319). Since the timing T810 is a timing before the timing T806, the current scene number Ncurrent=1 is set as the start number Nstart. Then, at a timing T811 at which instructions to end the recording are provided, the camera 201 ends the recording of the moving image (S320), sets the elapsed time Tcurrent as a moving image time Tmov (S321), and assigns a file name to a file of the recorded moving image (S322). The camera 201 receives the current scene number Ncurrent=2 from the camera 202 and updates its own current scene number Ncurrent to "2" at the timing T806 during the recording of the moving image (S316). Moreover, the camera 201 receives the current scene number Ncurrent=3 from the camera 203 and updates its own current scene number Ncurrent to "3" at the timing T809 (S316). The start number Nstart remains at "1." Therefore, the camera 201 assigns a file name "camA_001-003_T810 (hour, minute, second).mp4" to the file of the recorded moving image.

After that, at a timing T812 at which an elapsed time (Tcurrent−Tmov) after the end of recording the moving image has exceeded the scene determination allowable time Tthres, the camera 201 updates the current scene number Ncurrent to "4" (S324). Then, the camera 201 transmits the current scene number Ncurrent=4 to the cameras 202 and 203 (S325). The cameras 202 and 203 update their own current scene numbers Ncurrent to the current scene number Ncurrent=4 received from the camera 201 (S310).

As described above, scene numbers are shared between a plurality of recording devices (such as cameras and recording machines) according to the present embodiment. Further, a file of recording data is recorded with a file name including a scene number at the start of recording the recording data and a scene number at the end of recording the recording data. Thus, even when recording is performed over a plurality of scenes, it is possible to easily grasp which scene a recorded file corresponds to. Note that the present invention is not limited to the embodiments described above.

According to the present disclosure, it is possible to easily understand which scene a recorded file corresponds to even when recording is performed over a plurality of scenes.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The computer may correspond to each of the cameras 201 to 203. In particular, each of the cameras 201 to 203 may execute the said computer executable instructions. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2021-173669, filed on Oct. 25, 2021, which is hereby incorporated by reference herein in its entirety.

What is claimed is:

1. A recording device comprising at least one memory and at least one processor which function as:
a setting unit configured to set a scene number;
a communication unit configured to perform transmission and reception of a scene number to share the scene number with at least one other recording device; and
a recording unit configured to record a file of recording data with a file name including a scene number at a start of recording the recording data and a scene number at an end of recording the recording data, wherein
the setting unit updates a scene number with an elapse of a predetermined time after the end of recording the recording data, and
in a case where a scene number is received by the communication unit before the predetermined time elapses after the end of recording the recording data, the setting unit updates a scene number to the received scene number, and does not update the scene number with the elapse of the predetermined time after the end of recording the recording data otherwise.

2. The recording device according to claim 1, wherein the at least one memory and the at least one processor further function as a reception unit that is able to receive a predetermined operation, and
the setting unit does not update a scene number with the elapse of the predetermined time after the end of recording the recording data in a case where the predetermined operation is performed before the predetermined time elapses after the end of recording the recording data.

3. The recording device according to claim 2, wherein the predetermined operation is an operation to invalidate an update of the scene number set by the setting unit.

4. The recording device according to claim 1, wherein in a case where a scene number is received by the communication unit before a predetermined time elapses after the start of recording the recording data, the recording unit records the file of the recording data with a file name including the received scene number and the scene number at the end of recording the recording data.

5. The recording device according to claim 4, wherein in the case where a scene number is received by the communication unit before a predetermined time elapses after the start of recording the recording data, the recording unit records the file of the recording data with a file name including a time at which the recording started.

6. The recording device according to claim 5, wherein the time is expressed as a string of numbers representing the hour, minute and second at which the recording started.

7. The recording device according to claim 2, wherein the end of recording the recording data is determined based on an instruction to end the recording of the recording data which is received by the reception unit.

8. The recording device according to claim 1, wherein the recording data is a moving image.

9. The recording device according to claim 1, wherein the recording data is a sound file.

10. An imaging device comprising:
an image sensor; and
the recording device according to claim 1 that is configured to record a file of a moving image captured by the image sensor.

11. A recording method comprising:
setting a scene number;
performing transmission and reception of a scene number to share the scene number with at least one other recording device; and
recording a file of recording data with a file name including a scene number at a start of recording the recording data and a scene number at an end of recording the recording data,
wherein a scene number is updated with an elapse of a predetermined time after the end of recording the recording data, and
in a case where a scene number is received before the predetermined time elapses after the end of recording the recording data, a scene number is updated to the received scene number, and the scene number is not updated with the elapse of the predetermined time after the end of recording the recording data otherwise.

12. A non-transitory computer readable medium that stores a program, wherein the program causes a computer to execute a recording method comprising:
setting a scene number;
performing transmission and reception of a scene number to share the scene number with at least one other recording device; and
recording a file of recording data with a file name including a scene number at a start of recording the recording data and a scene number at an end of recording the recording data,
wherein a scene number is updated with an elapse of a predetermined time after the end of recording the recording data, and
in a case where a scene number is received before the predetermined time elapses after the end of recording the recording data, a scene number is updated to the received scene number, and the scene number is not updated with the elapse of the predetermined time after the end of recording the recording data otherwise.

* * * * *